United States Patent
Vara

Patent Number: 6,164,582
Date of Patent: *Dec. 26, 2000

[54] ENHANCED STORAGE SYSTEM FOR ELECTRICAL APPLIANCES, POWERCORDS AND ADAPTERS

[75] Inventor: James E. Vara, Dallas, Tex.

[73] Assignee: Reel Butler, Inc., Dallas, Tex.

[ * ] Notice: This patent is subject to a terminal disclaimer.

[21] Appl. No.: 09/171,871

[22] PCT Filed: May 29, 1997

[86] PCT No.: PCT/US97/09080

§ 371 Date: Oct. 27, 1998

§ 102(e) Date: Oct. 27, 1998

[87] PCT Pub. No.: WO97/45043

PCT Pub. Date: Dec. 4, 1997

Related U.S. Application Data

[63] Continuation-in-part of application No. 08/325,039, Oct. 18, 1994, Pat. No. 5,531,333.

[51] Int. Cl.⁷ ............ B65H 75/30; B65H 75/44; B65H 75/38; H02G 11/00

[52] U.S. Cl. ............ 242/395; 242/400.1; 242/402; 242/404.1; 242/404.3; 242/405.2; 242/405.3; 242/407; 211/26; 211/70.6; 191/12.2 R

[58] Field of Search .................... 242/395, 395.1, 242/400, 400.1, 402, 404.1, 404.3, 405.2, 405.3, 407; 211/26, 70.6, 189; 248/13, 51, 52, 205.2; 191/12.2 R

[56] References Cited

U.S. PATENT DOCUMENTS

| | | |
|---|---|---|
| 1,910,597 | 5/1933 | Elliott . |
| 1,983,565 | 12/1934 | Replogle . |
| 2,412,396 | 12/1946 | Hanna . |
| 2,438,188 | 3/1948 | Thrower . |
| 2,449,464 | 9/1948 | Eypper . |
| 2,938,514 | 5/1960 | Berg . |
| 3,044,732 | 7/1962 | Simonds . |
| 3,078,058 | 2/1963 | Roe . |
| 3,585,324 | 6/1971 | Rensdorfer et al. . |
| 3,705,697 | 12/1972 | Chagnon . |
| 3,809,331 | 5/1974 | Gaul . |
| 3,907,236 | 9/1975 | Sims, Jr. . |
| 4,150,798 | 4/1979 | Aragon . |
| 4,585,194 | 4/1986 | Schwob . |
| 4,862,636 | 9/1989 | Doskocil . |
| 5,056,698 | 10/1991 | Kozakevich . |
| 5,230,480 | 7/1993 | Perry . |
| 5,388,877 | 2/1995 | Wenk . |
| 5,531,333 | 7/1996 | Vara . |
| 5,727,745 | 3/1998 | Vara . |

FOREIGN PATENT DOCUMENTS

| | | |
|---|---|---|
| 161645 | 12/1957 | Sweden . |
| 2264925 | 9/1993 | United Kingdom . |
| 94/15867 | 7/1994 | WIPO . |

OTHER PUBLICATIONS

Grainger Industrial Equipment and Commercial Equipment and Supplies; 1994 Gneral Catalog No. 385; W. W. Grainger, Inc., 2639 Main St., Dallas, TX 75226–1411; Catalog pp. 850–853; "Cord reels, cord reel lights, and Hand Rewind Reels" 1994.

James E. Vara, Inventor Confidential Invention Disclosure Form: 9 pgs including its attached sketches, sheets 1—5, signed by James E. Vara, Inventor.

*Primary Examiner*—John Q. Nguyen
*Attorney, Agent, or Firm*—Crutsinger & Booth

[57] ABSTRACT

A storage system is provided for organizing, handling, and storing small electrical appliances with powercords and adapters, in an orderly and efficient manner for ease of access, and especially for handling and storing loose powercords. The system comprises a powercord storage tool, and an appliance storage container. The powercord storage tool provides efficient device for gripping, winding, and retaining a powercord. It also provides a device for attaching the tool, with powercord on it, to an electrical appliance, and alternately for attaching the tool, with powercord on it, to the outside of the appliance storage container. The appliance storage container provides a device for storing the appliance inside, and a rack on the outside for attaching and holding the tool, with powercord wound thereon, onto the outside of the container. The tool also provides a device for manually guiding and providing direct sensory feedback to the operator of the tension on the powercord while it is being wound onto the powercord storage tool.

13 Claims, 7 Drawing Sheets

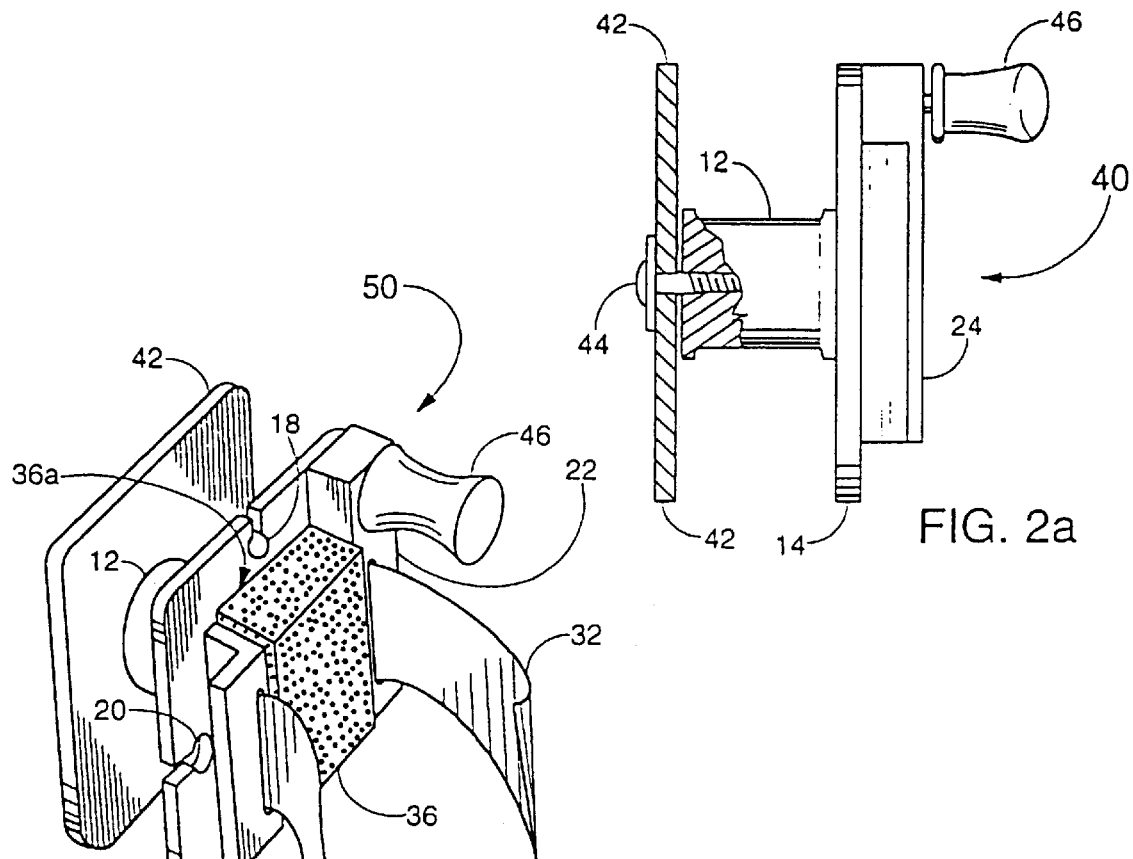
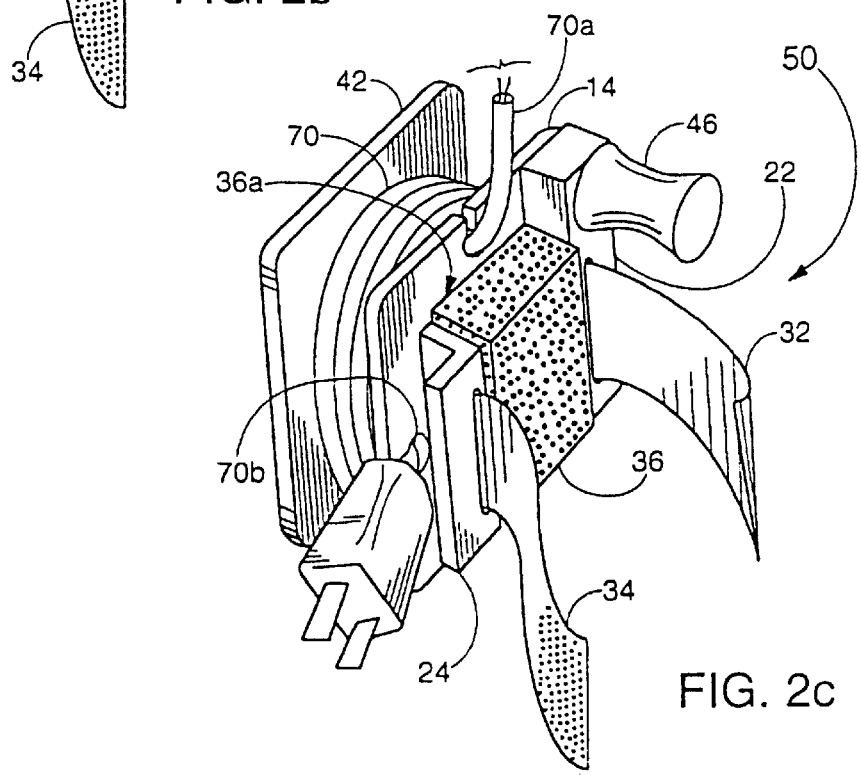

ENHANCED STORAGE SYSTEM FOR ELECTRICAL APPLIANCES, POWERCORDS AND ADAPTERS

This application is a continuation-in-part of parent application Ser. No. 08/325,039 filed Oct. 18, 1994, U.S. Pat. No. 5,531,333. This continuation-in-part application claims benefits of earlier filing date of said parent application; is by the same inventor as the parent application; and was filed prior to patenting, abandonment, or termination of proceedings of said parent application, in accordance with 35 U.S.C. 120.

TECHNICAL FIELD

This invention relates to electrical power tools, and in particular to a revised system of storage apparatus for receiving, handling, and storing small electrical and electronic appliances, including their powecords and adapters.

BACKGROUND OF THE INVENTION

Millions of small electrical appliances are in use in industrialized society, not only in industry, but in offices, schools, and households as well. There is proliferation of hair dryers, razors, hair clippers, curling irons, nail polishers, electric toothbrushes, irons, drills, glue guns, sprayers, mixers, electric knifes, slicers, and the like. Each appliance requires its own loose powercord. There is also proliferation of a new generation of very small electronic appliances such as cassette players, CD-ROM drives, cellular telephones, desktop and laptop computers, computer games, game controls, recharging devices, converters, adapters, and interface modules, each requiring a powercord. Many very small appliances require a converter, adapter, or recharger which is most often affixed not to the appliance but to the powercord, to eliminate bulk from the appliance. Portable computers comprise separate portable modules, disc drives, modems, and interface terminals, which require cords and adapters of various configurations.

Often within a household, each person has his and her own personal assortment of electric and electronic appliances, including personal hair dryer, razor, electric toothbrush, calculator, cassette player, CD drive, game cartridges, game controls, and headsets. Young persons especially are more and more equipped with many small appliances, electronic toys, games, game consoles, game controls, music devices, and gadgets requiring powercords, adapters, converters, and recharging devices. This results in household drawers and boxes of appliances, electronic devices, powercords, and adapters.

Each appliance requires its own loose powercord. None has been found to disclose a storage system comprising interfaced, detachable storage tool with storage bin shelf for retention and storage of appliances, cords, and storage modules in an orderly manner.

As the pace of life accelerates, there is increasing necessity to minimize the clutter of small appliances with loose cords and adapters. Yet, prior to this application, nothing had been disclosed to solve the problem. Drawers of powercords, adapters, and appliances continue to grow. An executive in one company that manufactures small appliances has commented that one problem in the industry is the nightmare of what to do with the maze of assorted powercords. A need exists for system, apparatus, and methods for efficient handling of small appliances, powercords and adapters, and especially for storing loose powercords.

SUMMARY OF THE INVENTION

In accordance with one aspect of the present invention, a storage system comprising an interfaced-detachable storage tool device, storage bin container, and rack is provided to reel-in and store the cord of an electrical appliance, and to hold and store the appliance and adapter, all efficiently stored in and on the storage bin rack. The cord storage module, with cord stored thereon, fits and matches the appliance for which it is selected, without modification or physical change to the appliance. The module may be interfaced with and re-attached to its appliance by quick-acting hook-and-loop straps, thus keeping each cord efficiently with its appliance.

In another aspect of the present invention, the interfaced, hand-held storage tool with powercord wound thereon, is capable of efficient storage within a storage bin and attachment to a rack, by rails located on one flange of the storage tool. The rail, or equivalent attachment means, interfaces with a rack such as a series of matching slots, or equivalent attachment hardware, on the rack.

In accordance with another aspect of this invention, the storage tool with powercord wound thereon may be interfaced and attached to its respective appliance as a unit, with said unit being capable of efficient storage in, and attachment to, a special storage bin rack.

In accordance with another aspect of this invention, this interface-attached and detachable, hand-held storage tool with powercord wound thereon, may be attached alternately, either to the appliance, or to the storage rack for good order and ease of access.

In accordance with an additional aspect, the powercord storage tool comprises a retaining member flange which may be attached directly to the outside of the storage bin container without requiring rail brackets. The interface pad, the hook-and-loop straps, and the rails or "rail-brackets," are eliminated from the tool, enabling the rotating member, or retaining member, of the tool to fit directly into the slot, or interface rack, on the front of the storage bin container. The interface rack has been shaped to receive the retaining member; and the front edge of the container is shaped to accommodate the rotating knob of the tool, permitting the knob to extend over the edge and into the storage container, as the tool is attached directly onto the outside. The retaining member slips directly into the interface rack on the front of the container. This simplifies construction of the tool and the interface rack.

In accordance with an additional embodiment of this invention, the finger grips on the powercord storage tool have ben ergonomically designed and shaped to fit and be held by the fingers of one hand of an operator, and to provide openings between the fingers holding the tool, that the fingers may efficiently accommodate and control flow of the powercord as it is being wound onto the spool or retaining member, providing direct sensory feedback to the operator of the tension on the powercord while it is being wound onto the storage tool. In this embodiment, there are four fingers grips mounted on the base, each concavely curved to accommodate the natural shape of human fingers. A pair of finger grips are opposingly mounted on two opposing sides of the base. Two opposing edges of the base are each shaped to contain two concave indentions; each indention shaped to match and receive the convex shape of a human finger, and arranged for the tool to be grasped and held in one hand. A finger grip is fixedly attached at each of said indentions of the base. The base of the powercord storage tool is held by the fingers of one hand while the other hand rotates the knob of the rotating member, thus adroitly winding the cord onto the storage tool. With the base held by one hand, the incoming cord, as it is being wound onto the spool or retaining member, is snugged lightly between fingers of that hand and are guided into the opening between fingers and finger grips on the retaining member, thus giving the operator control of the tension and direction of flow of the cord, permitting it to be kept appropriately tight and snug on the spool and eliminating kinks to arrange it straight and smooth on the spool. This enhances efficiency, ease, and expediency of winding and storing the loose powercord.

BRIEF DESCRIPTION OF THE DRAWINGS

A more complete understanding of the Invention can be had by referring to the following Detailed Description, taken with the accompanying drawings, wherein:

FIG. 2a is a side view of rotatable storage tool 40 forming another embodiment of the present invention, attachable to a storage bin rack.

FIG. 2b is an isometric perspective view of rotatable storage tool 50, as another embodiment of tool 40, but with quick-acting, hook-and-loop straps for interface attachment to a typical appliance.

FIG. 2c is likewise an isometric perspective view of tool 50, showing a typical powercord wrapped on the retaining member.

FIG. 10 also shows schematic alignment of two powercord storage tools 250, in location and alignment above the respective interface racks, into which they may be inserted, for holding said tools outside said containers.

DETAILED DESCRIPTION OF THE PREFERRED EMBODIMENT

Figure 1A:
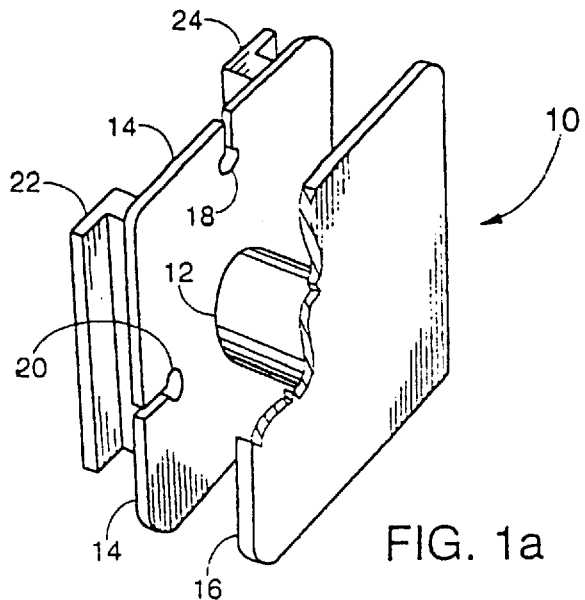
FIG. 1a is an isometric perspective view of non-rotating storage tool 10 forming one embodiment of the present invention.

Referring now to the drawings, wherein like reference numerals designate like or corresponding parts throughout the several views; in FIG. 1a, there is illustrated a storage tool 10 forming one embodiment of the present invention, but empty, i.e., without powercord.

Figure 5:
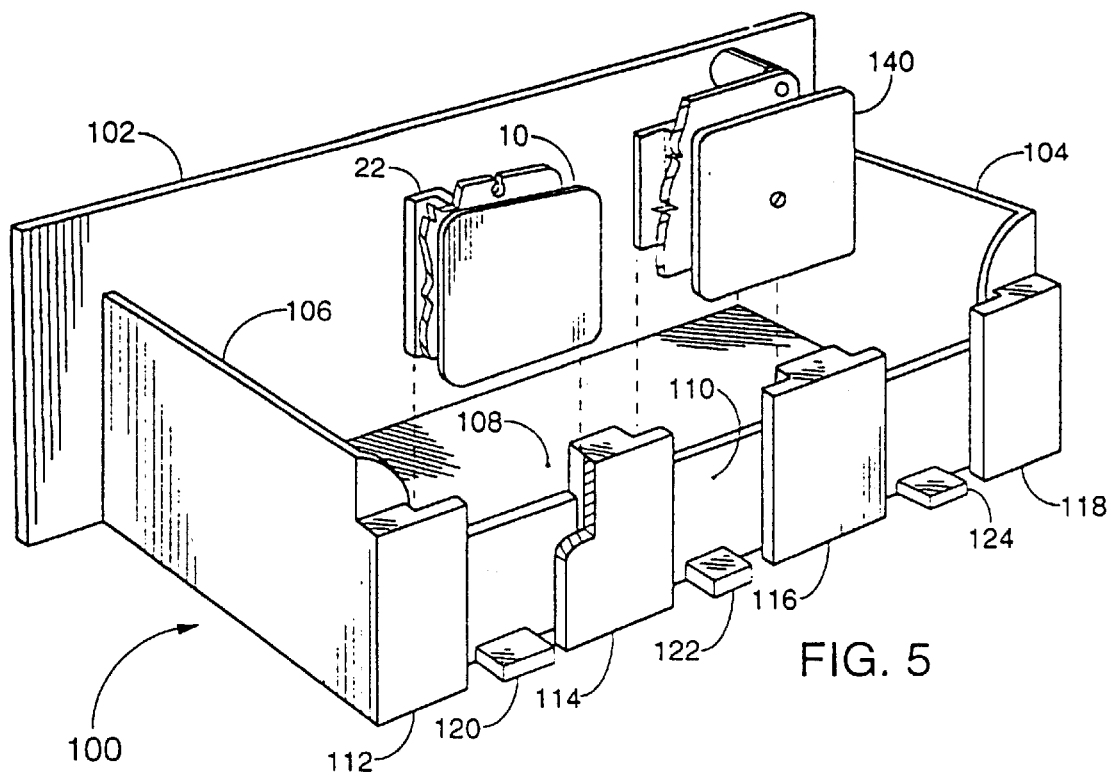
FIG. 5 is an isometric perspective view of storage bin rack 100 as another aspect of this invention, shown empty, showing the bin and rack which can hold, store, and interface with typical appliances and with rail-bracket rails of said storage tools.
Figure 6:
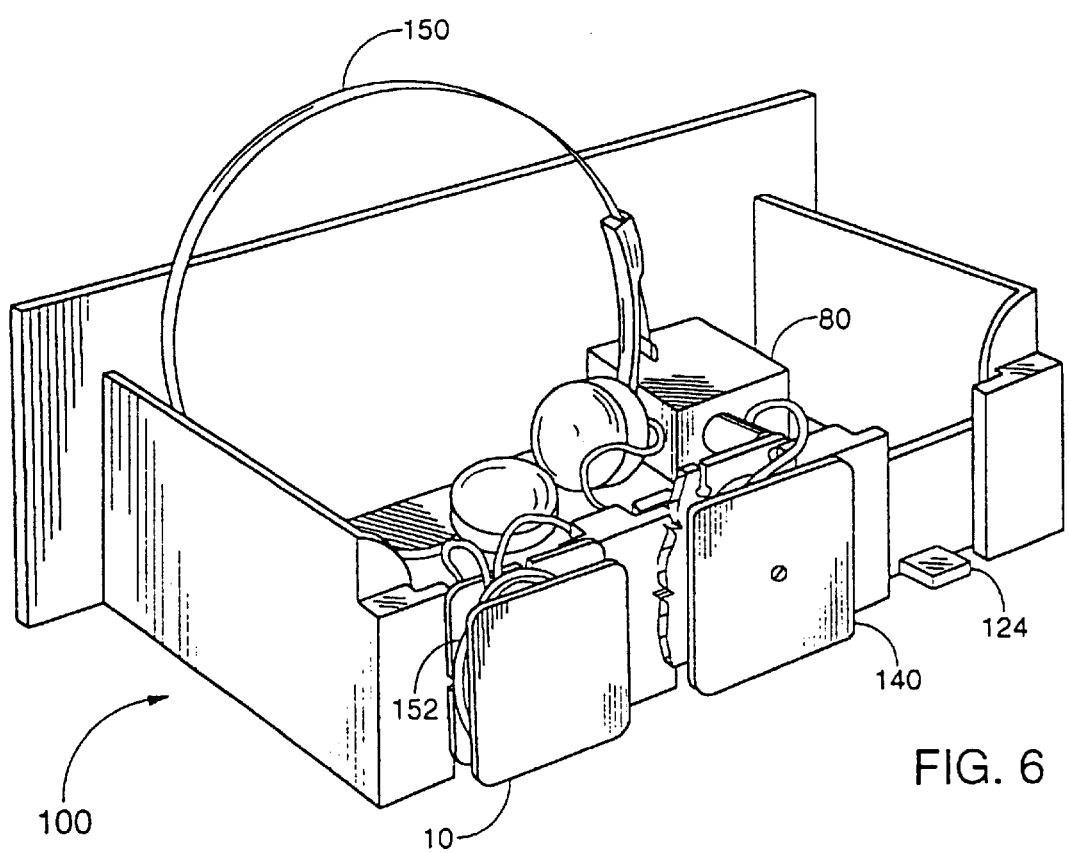
FIG. 6 is an isometric perspective view of storage bin rack 100, showing typical use of the components of the storage system of this invention, with typical appliances in typical positions as they would be stored and fitted in and on a storage bin rack.

FIG. 1a is an isometric perspective view of empty storage tool 10, without powercord, comprising retaining member 12 with non-rotating flange 14 located on one end and non-rotating flange 16 on the other end. Flange 14 contains notches 18 and 20 for securing the ends of a typical powercord not shown in FIG. 1a, to be wrapped onto retaining member 12. Rail-brackets 22 and 24 are shown as fixedly attached to flange 14 and shaped and arranged in a manner as shown in FIGS. 5–6 to match and fit within storage slot 112–114 of storage bin 100.

Figure 1B:
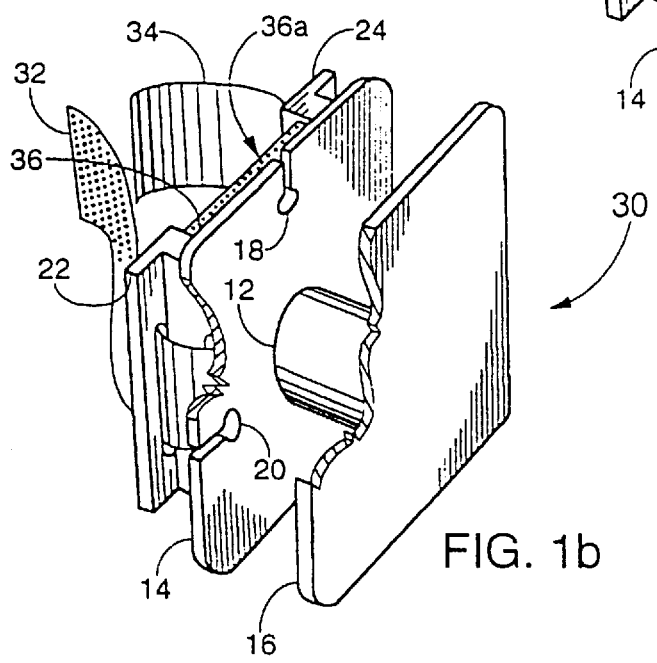
FIG. 1b is an isometric perspective view of non-rotatable storage tool 30, without powercord, with straps for interface attachment to appliance.
Figure 1C:
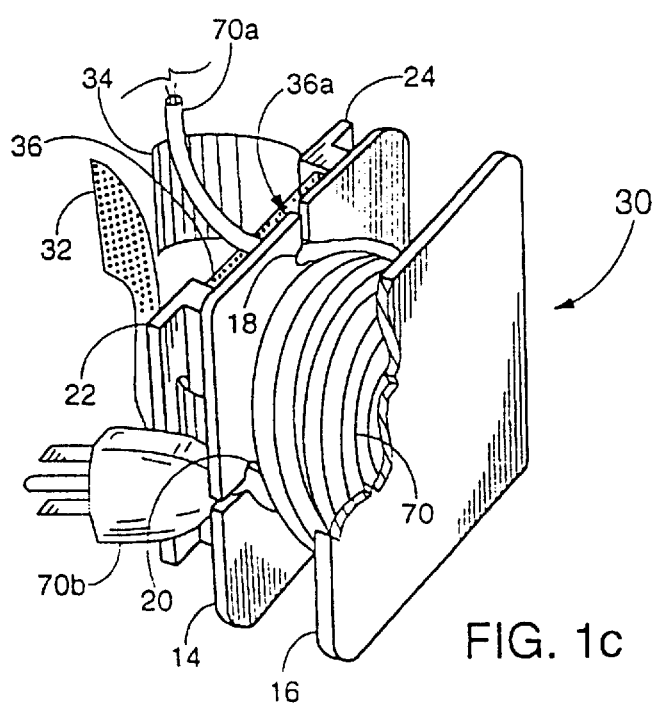
FIG. 1c is an isometric perspective view of tool 30, showing a typical powercord wrapped on the retaining member.

FIGS. 1b–1c are perspective views of storage tool 30, which is another embodiment of this invention. In FIG. 1b, tool 30 is empty, i.e., without powercord, and for illustration purposes, parts of flanges 14 and 16 have been cut away to show retaining member 12, as in other drawings herein. Notice that tool 30 is another embodiment of tool 10 of FIG. 1a. In tool 30, contact surface 36a has been selected for interface with a typical appliance; flange 14 is fitted, at surface 36a, with resilient interface pad 36 which may be compressed to conform to the shape of handle 74 as shown in FIG. 3; rail-brackets 22 and 24 are shaped and arranged, as shown in FIG. 3, to align with handle 74 of a typical electrical appliance 72; and contact surface 36a, as fitted with resilient, conformable pad 36, and rail-bracket rails 22 and 24, which together cooperatively form a concave interface pocket, shaped to conform to a selected portion such as a handle 74 of a selected, typical electrical appliance such as a typical hair dryer 72; and flexible straps 32 and 34 are fixedly attached to flange 14 and to rail-brackets 22 and 24 respectively, as means for attaching tool 30 to handle 74, in a manner as shown in FIG. 3 wherein they may be wrapped around handle 74 and removably latched.

Figure 3:
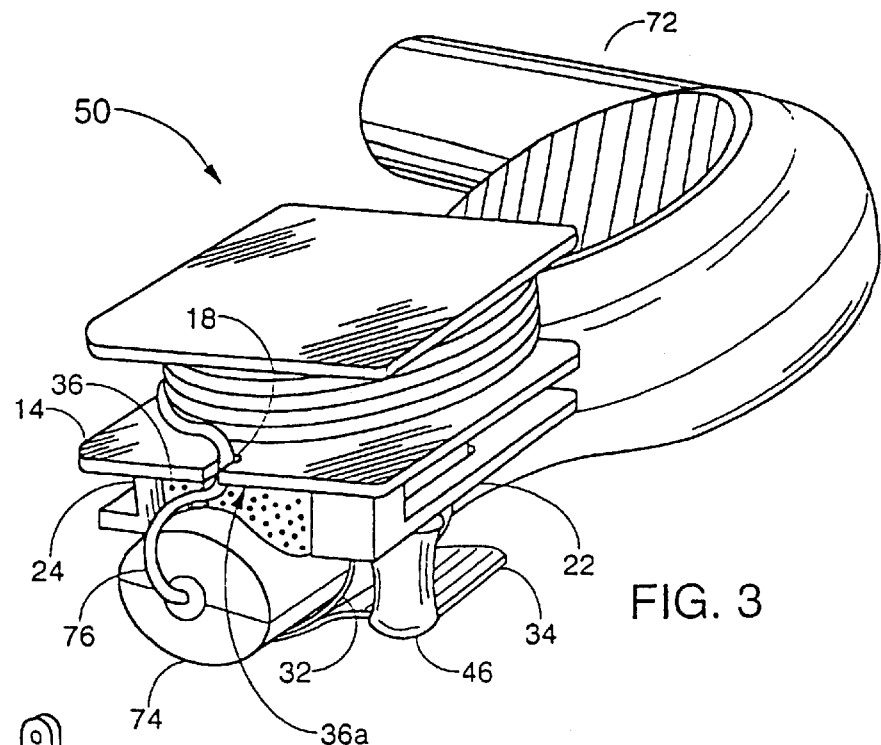
FIG. 3 is an isometric perspective view of rotatable tool 50, as it would be interfaced with an attached to the handle of a typical appliance such as an electric hair dryer.

In the embodiment of FIG. 1b, means for attaching the tool 30 to handle 74 as shown in FIG. 3, is disclosed as flexible straps 32 and 34, comprising flexible, quick-acting, plastic hook-and-loop materials, but may equivalently be comprised of other attaching means well known to persons of ordinary skill in the art, such as straps with a buckle, and other equivalent means for attaching.

FIG. 1c is an isometric perspective view of tool 30 with a typical powercord 70 stored thereon, being wound between flanges 14 and 16 onto retaining member 12, which in this view is hidden beneath powercord 70. FIG. 1c illustrates that one end of powercord 70 may be removably gripped in notch 18, and the other end of powercord 70 likewise may be gripped in notch 20.

FIG. 2a is an illustration of rotatable storage tool 40 comprising retaining member 12 with flange 14 fixedly attached to one end of retaining member 12, and with flange 42 rotatably attached to the other end of retaining member 12 by means of pivot pin 44. Knob handle 46 is rotatably attached to an outside portion of flange 14 as means for manually rotating flange 14 and retaining member 12 about pivot pin 44 with respect to flange 42. Rail-bracket 24, and likewise typical rail-bracket 22 which is not visible in this view of FIG. 2a, are fixedly attached to flange 14, as means for fitting tool 40 into matching slot 112–114 of a storage bin 100 as shown in FIG. 5.

FIG. 2b shows rotatable storage tool 50 as another embodiment of this invention, wherein tool 50 is similar to rotatable tool 40 of FIG. 2a. In tool 50, rail-brackets 22 and 24 are arranged, as shown in FIG. 3, to align with handle 74 of a typical electrical appliance 72; resilient interface pad 36 is fitted and fixedly attached to flange 14 at surface 36a between rail-brackets 22 and 24; is made of resilient material such as plastic sponge; and may be compressed to conform to the shape of handle 74 as shown in FIG. 3; and contact surface 36a as fitted with resilient, conformable pad 36 and side rails 22 and 24, together form a concave interface pocket, shaped to conform to a selected portion such as a handle 74 flexible straps 32 and 34 are fixedly attached to flange 14 and to rail-brackets 22 and 24 respectively, in a manner as shown in FIG. 2b wherein they may be wrapped around handle 74 and removably latched, as shown in FIG. 3.

In FIG. 2b, means for attaching tool 50 to handle 74 as shown in FIG. 3, is disclosed as flexible straps 32 and 34, comprising flexible, quick-acting, plastic hook-and-loop materials; but the attaching means may equivalently be comprised of other attaching means well known to persons of ordinary skill in the art, such as flexible straps with a buckle, clamps, gripping hardware, and other equivalent means for attaching.

FIG. 2c of rotatable storage tool 50, shows how a typical powercord 70 may be stored thereon by winding it onto retaining member 12 between flanges 14 and 16, illustrating that one end of powercord 780 may be removably gripped in notch 18, and the other end likewise gripped in notch 20.

FIG. 3 illustrates rotatable storage tool 50 as interfaced and fitted onto typical handle 74 of a typical appliance 72, by means of rail-brackets 22 and 24 and resilient interface pad 36 which resiliently conforms to the shape of handle 74 as shown in FIG. 3, and as removably attached to handle 74 by attaching means well known in the art such as straps 32 and 34 which are in this embodiment comprised of flexible, quick-acting, plastic hook-and-loop materials.

Figure 4:
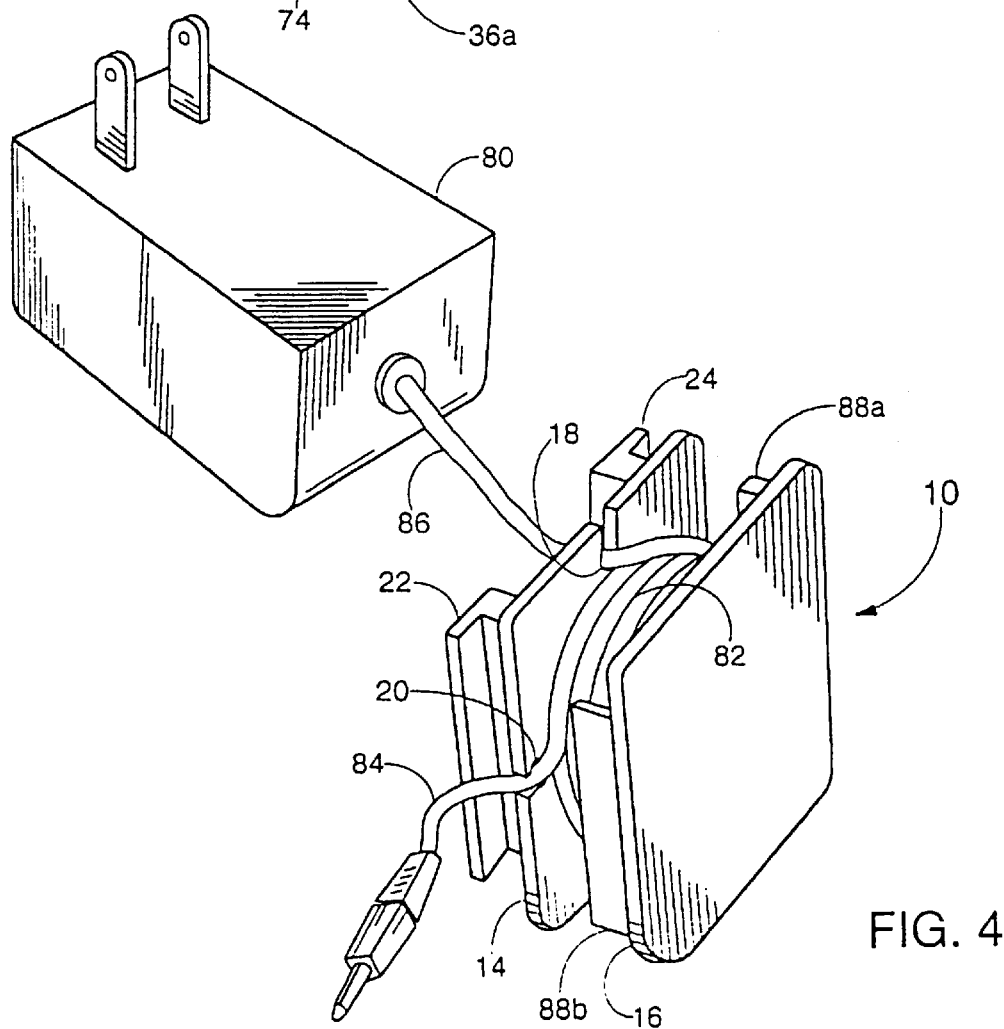
FIG. 4 is an isometric perspective view of non-rotatable tool 10, with rail-bracket rails for a storage rack, showing the powercord and converter, of an appliance requiring conversion from AC to DC power, with the converter end of said cord gripped in an notch in one of the flanges.

FIG. 4 is an illustration of storage tool 10 as disclosed in this invention, showing how tool 10 will be used to store a typical powercord 82 for a typical appliance such as converter 80 by wrapping powercord 82 about retaining member 12, which in this view is hidden beneath powercord 82, wound between flanges 14 and 16, with the converter end 86 of said powercord 82 gripped in notch 18 and the plug end 84 gripped in notch 20. It will be apparent as disclosed in this invention, that other embodiments such as storage tools 10, 30, 40, and 50, and other equivalent embodiments, will likewise be useable for storage of powercords of other small electric appliances and electronic appliances, including powercords with adapters, converters, and recharging devices fixedly attached such as converter 80.

FIG. 4 also shows how a pair of finger grips 88a and 88b may be affixed to the inside face of opposing edges of flange 16, for ease of holding tool 10 in one hand while powercord 82 is manually wound onto retaining member 12 not shown in this view of FIG. 4. Equivalently, said finger grips 88a and 88b may be likewise affixed to flange 16 of tool 30, and equivalently, likewise affixed to flange 42 on tool 40, and equivalently tool 50, for ease of holding in one hand.

FIG. 5 illustrates storage bin 100, comprised of back 102, fight side 104, left side 106, bottom 108, and front 110, which in turn is fitted with left T-flange 112, left-center T-flange 113, right-center T-flange 116, and right T-flange 118, which are each shaped and arranged as shown in FIG. 5 to form matching slots 112–114, 114–116, and 116–118, respectively. The bottom of each slot 112–114, 114–116, and 116–118, is each respectively closed with stops 120, 122, and 124.

In FIG. 5, tool 10 and tool 140 are shown for purposes of schematic illustration as schematically suspended above and aligned with slots 112–114 and 114–116, respectively, into which they each may be fitted for storage, as shown in FIG. 6. Notice in the embodiment of tool 140 as shown in FIGS. 5–6, tool 140 is similar to rotatable storage tool 40 of FIG. 2a.

FIG. 6 shows an additional view of storage bin 100 as disclosed in this embodiment, holding storage tool 10 fitted into slot 112–114, with powercord 152 of typical small electronic appliance such as earphone-headset 150 wound onto storage tool 10, and in turn, earphone-headset 150 is stored within bin 100. Likewise, FIG. 6 shows storage bin 100 holding storage tool 140 with powercord 82 wrapped thereon of typical small electronic appliance such as converter 80, which in turn is stored within storage bin 100, while rail-brackets are fitted within slot 114–116.

To assure complete disclosure, although in some places redundant, it is emphasized that the rotatable storage tool 50 attaches to typical handle 74 of typical electric hair dryer 72 without requiring modification of the hair dryer in any manner. Storage tool 50 with typical powercord 76 wound thereon, interfaces with and is attached to handle 74 of typical hair dryer appliance 72, and attaches thereto of its own means. It will be apparent that rotatable storage tool 50 as shown in FIGS. 2b, 2c, and 3, is fitted with rail-brackets 22 and 24 which are arranged to interface and fit within slot 112–114, and equivalently with slots 114–116, and equivalently with slot 116–118, of storage bin 100 of FIG. 5. Thus, rotatable storage tool 50 with typical powercord 70 wound thereon, may be stored by fitting it into slots 116–118 in a manner equivalently shown for tools 10 and 140 in FIG. 6.

In FIG. 2b, storage tool 50 comprises retaining member 12, with first flange 14 fixedly attached to one end of said retaining member 12. Second flange 42 is rotatably attached, by means of pivot pin 44, which is not visible in views of FIGS. 2b and 2c, to the other end of retaining member 12. A first notch 18 is located on first flange 14, for gripping an end of typical powercord 70. A second notch 20 is likewise located in first flange 14 for gripping another end of typical powercord 70. Notches 18 and 20 may be any equivalent gripping, cleating, or wedging means for securing the cord 70 to retaining member 12 to prevent unwinding. Retaining member 12 is shaped to receive powercord 70 as said cord 70 is wound onto the storage tool 50.

Knob handle 46 is rotatably attached near the perimeter of non-rotatable first flange 14. Knob 46 is used for manually rotating retaining member 12, with its fixedly-attached flange 14, about pivot pin 44 with respect to rotatable flange 42.

An interface contact surface 36a is located on first flange 14. Contact surface 36a is fitted with resilient, conformable paid 36 and side rails 22 and 24, which together form a concave interface pocket, shaped to conform to a selected portion such as a handle 70 of a selected, typical electrical appliance such as typical hair dryer 72.

A pair of straps 32 and 34 are affixed to first flange 14 in a manner to include two opposing sides of contact surface 36a. The loose strap ends 32 and 34 are configured and arranged to be capable of being selectively wrapped and latched around a selected portion such as handle 74 of typical appliance 72 as shown in FIG. 3. Straps 32 and 34 may be made of conventional strap material such as fabric, leather, or plastic, and may be fitted with conventional fasteners such as snaps, buckles, and equivalent fitting means. In this embodiment, straps 32 and 34 are made of plastic, quick-latching, multiple hook and compatible multiple loop material fastener means of a type conventionally sold under the Velcro® trademark, which is capable of quick attachment and release.

Retaining member 12, flanges 14 and 16, pivot pin 44, knob 46, and rail-brackets 22 and 24, and likewise retaining member 214, base 242, knob 246, and finger grips 248, may be made of any conventional manufacturing materials of adequate strength for fabrication or casting, such as wood, metal, and equivalently plastic. Pad 36 may be made of conventional, light-weight resilient materials such as sponge rubber, plastic, and the like.

In typical embodiments, such as FIGS. 1–6 and likewise FIGS. 7–11, the structural components of this invention are made of plastic, and equivalent light-weight, durable materials, for ease and economy of manufacture, and for reliability, structural strength, and light weight.

Accordingly, fixed flange 14 and 214 and retaining member 12 may be of plastic cast as a unit, which may be referred to as the rotor and equivalently the retaining member, comprising said fixed flange 14 and 214 with retaining member fixedly attached thereto, and forming a part of said rotor.

The attachment is accomplished without modification of the appliance in any manner, and is thus readily fitted to many different small appliances. In this embodiment, storage tool 50 would be manufactured to interface with the particular appliance 72, by selecting a preferred portion 74 of that appliance 72 for attachment. Contact surface 36a, pad 36, and rail-brackets 22 and 24 are shaped and arranged to conform to and fit around the shape of selected interface portion which in the FIG. 3 embodiment would be handle 74.

In still another aspect of the present invention, storage tool 50 is attachable to a storage rack 100. In this embodiment, rail-brackets 22 and 24 are shaped to fit and slip into matching slots 112–114 of storage slot 100. Slots 112–114, 114–116, will receive and retain rail-brackets 22 and 24 in a manner to hold storage tool 50 in a selected stored position, for ready ease of access and orderly storage. In still another aspect, not illustrated here, it will be obvious that the capability for attachment of storage tool 50 to storage rack 60 may be omitted by not providing rails 22 and 24 on sided-braces 22 and 24. Or as seen in FIGS. 7–11, the capability for attachment of storage tool 250 to storage container 500 may be achieved, without rail-brackets, by shaping retaining member 214 and slot 512 to be directly compatible as explained below.

In typical usage as shown in FIGS. 2c and 2b, an operator will grasp empty storage tool 50 in one hand, holding it by flange 42. For ease of holding tool 50 in one hand, and equivalently for holding tool 40, and tool 50, in one hand, flange 42, and equivalently flange 16 of tools 10 and 30, may be fixedly equipped with finger grips 88a and 88b, as shown on flange 16 of tool 10 in FIG. 4. Press the free end of powercord 70 into first notch 18. Grasp knob 46 with the other hand, and rotate first flange 14, as affixed to retaining member 12, about pivot point 44 to wind the free length of cord 70 onto retaining member 12 between flanges 14 and 44. Press the remaining end of cord 70 into notch 20 to prevent unwinding. Place the storage tool 50 with cord 70 wound thereon into position with contact surface 36a, pad 36, and rail-brackets 22 and 24 aligned and in contact with selected portion 74 of selected appliance 72. Snugly wrap and tightly latch the loose ends of straps 32 and 34 about selected portion 74. In this manner, the powercord 70 will be stored, and storage tool 50 will be attached as an integral part of appliance 72. Alternately and selectively, storage tools 10, 30, 40, 50, and 140, may be stored in storage bin 100, and selectively attached on said racks, per FIGS. 5–6.

FIGS. 7–11 shows disclosures of alternate embodiments and additional aspects of this invention over the basic disclosures of FIGS. 1–6.

Figure 7A:
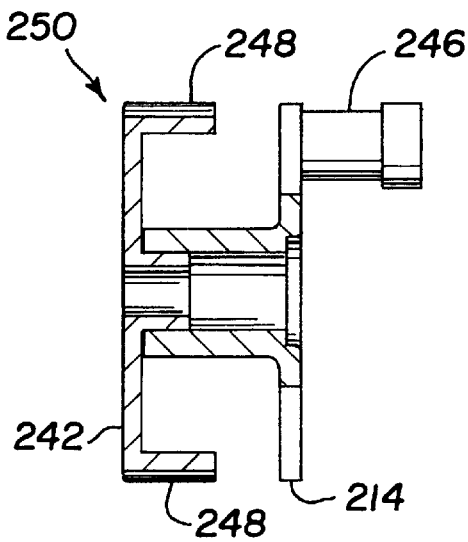
FIG. 7a is a side view of rotatable storage tool 250 forming another embodiment, in which interface pad, rail-bracket, and quick-latching straps have been eliminated, showing additional aspects of direct attachment of the storage tool to the storage bin container.
Figure 10:
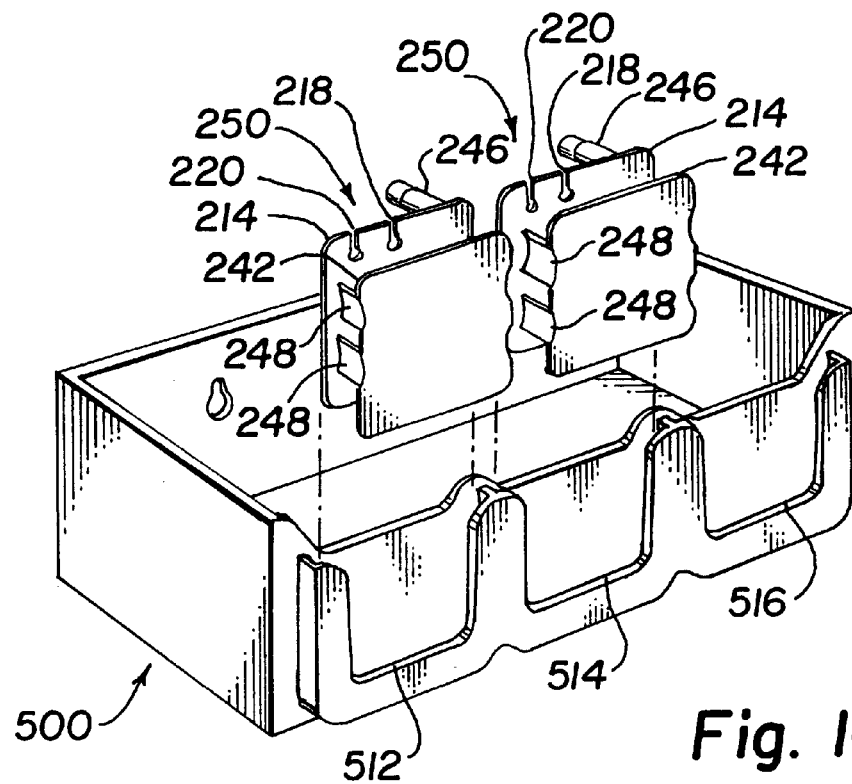
FIG. 10 is an isometric perspective view of storage bin container 500 as another embodiment of this invention, shown empty, which can hold, store, and interface with typical appliances, adapters, and storage tools, and shown with interface racks or slots on the front which interface and fit directly with the retaining member 214 of powercord storage tool 250, without the rail brackets that would otherwise be required.
Figure 11:
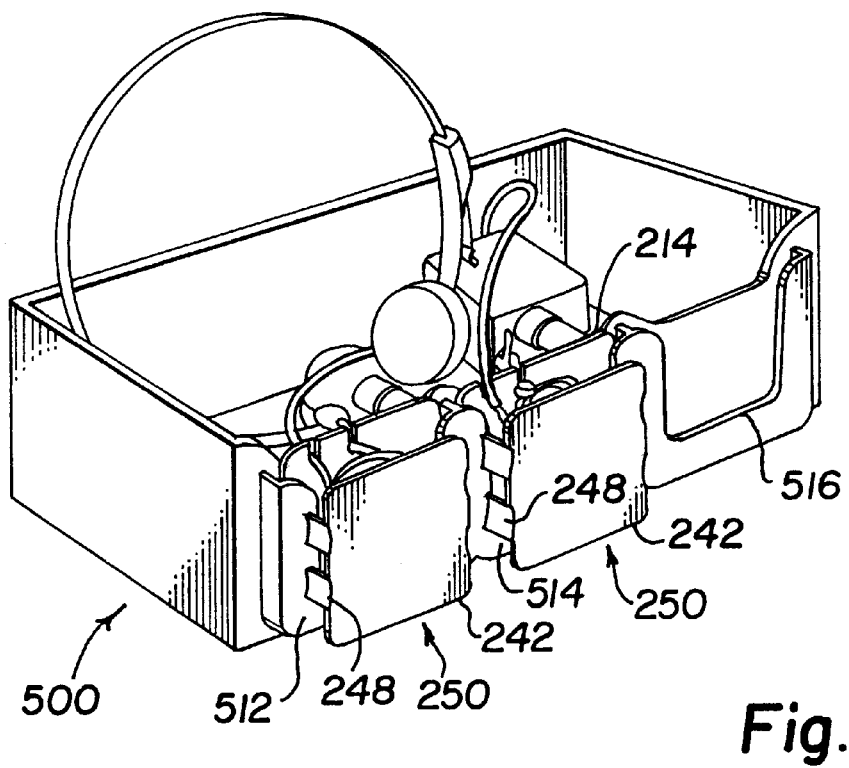
FIG. 11 is an isometric perspective view of storage container 500, showing typical use of the enhanced storage system of this invention, with typical appliances in typical positions as the powercord will be wound onto the storage tool 250, the appliances and adapters stored inside the appliance storage container 500, and the tools, with cord thereon, interfaced and fitted onto the outside of the container 500, on the container interface rack 512, or 514, or 516.

FIG. 7a is a side view of rotatable storage tool 250 forming an additional embodiment, showing an alternate means of interface attachment of the storage tool to the storage bin container. In this embodiment, the interface pad, rail-bracket, and quick-latching straps have been eliminated, thus presenting shape of flange 214 of the retaining member as a flat, planar surface, without obstruction, which can thus be fitted directly into interface rack 512, or 514, or 516, as shown in FIG. 10 and FIG. 11. This embodiment simplifies the construction of storage tool 250 and facilitates handling the storage tool 250 and rotation of the retaining member 214 for winding the powercord thereon. As shown in FIG. 10 and FIGURE 11, the racks, 512, 514, and 516, on the outside of the front of the storage container 500 are shaped to fit and directly accommodate the planar flange of the rotating member 214 of the powercord storage tool 250. Thus, after the powercord has been wound onto a storage tool 250, the tool 250 may be turned with the retaining member 214 parallel to the front of the container 500, with the rotating knob handle 246 in the upward position facing into the container 500. The flange 214 of retaining member 214 will slip directly into rack 512, or alternately, rack 514, or 516. FIG. 7a shows side view of base 242, showing ergonomically designed finger grips 248 attached, of which there are a total of four each finger grips 248 per tool 250.

Figure 7B:
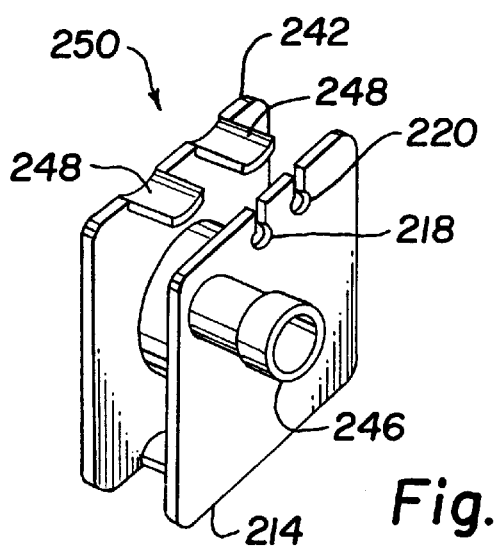
FIG. 7b is an isometric perspective view of rotatable storage tool 250, showing ergonomic finger grips as additional embodiments for holding said tool, for guiding the powercord onto the retaining member, and for providing direct sensory feedback to the operator of the tension on the powercord as it is being wound onto the storage tool.

FIG. 7b is an isometric perspective view of rotatable storage tool 250, as another view of this tool, showing the simplified planar design of flange 214, and additional aspects as the ergonomically designed and shaped finger grips 248 on base 242 provide means for holding said tool 250 in one hand of an operator, means for guiding said powercord between the fingers of the operator and onto the retaining member 214, and means for providing direct sensory feedback to the operator of tension on the powercord, and its position and condition, while the powercord is being wound onto the retaining member 214.

In this embodiment, the inventor has found and hereby discloses that efficiency of holding the tool 250, gripping the end of the powercord in the notch 218 on the flange 214, and turning the knob handle 246 on the retaining member 214 is enhanced, facilitating guidance of the powercord efficiently onto the retaining member 214. Finger grips are designed and shaped to fit the functional working surfaces of the fingers, whereby tool 250 can be handled more adroitly. Finger grips 248 have been placed on the tool in location, so that the fingers of the one hand holding the tool 250, can be concurrently and simultaneously used to keep the card straight, smooth, and snug.

In this embodiment, the tool is grasped in the fingers of one hand by the ergonomically designed finger grips 248, direct sensory feedback of tension on the cord is provided to the operator while the cord is being wound, permitting the operator to control and direct the flow and arrangement of the cord onto the tool. The term ergonomic as used herein is interpreted as biotechnological, of or pertaining to that aspect of technology, and particularly mechanical design, applied to function and movements of the human body, which is concerned with the application of biological and engineering data, both kinetic and dynamic, to problems relating to the mutual adjustment of man and the machine.

Figure 7C:
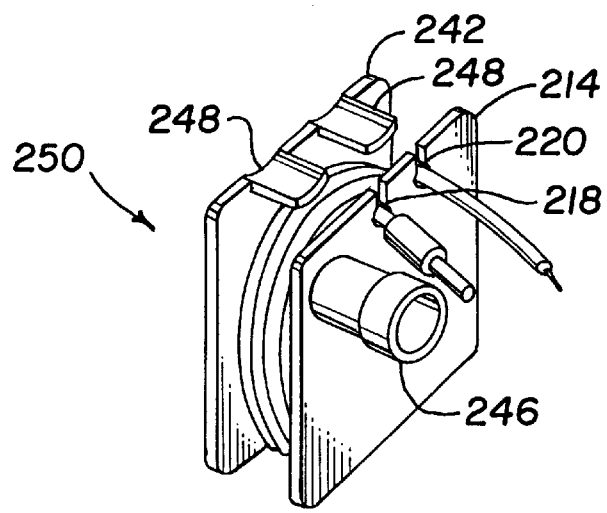
FIG. 7c is an additional isometric perspective view of tool 250, showing a typical powercord wound onto the retaining member.

FIG. 7c is likewise an isometric perspective view of tool 250, showing a typical powercord wound onto the retaining member. FIG. 7c shows base 242, shaped finger grips 248, of which there are four each per tool 250, flange-retaining member 214, rotating knob handle 246, notches 218 and 220, and showing a typical powercord wound onto retaining member 214.

Figure 8:
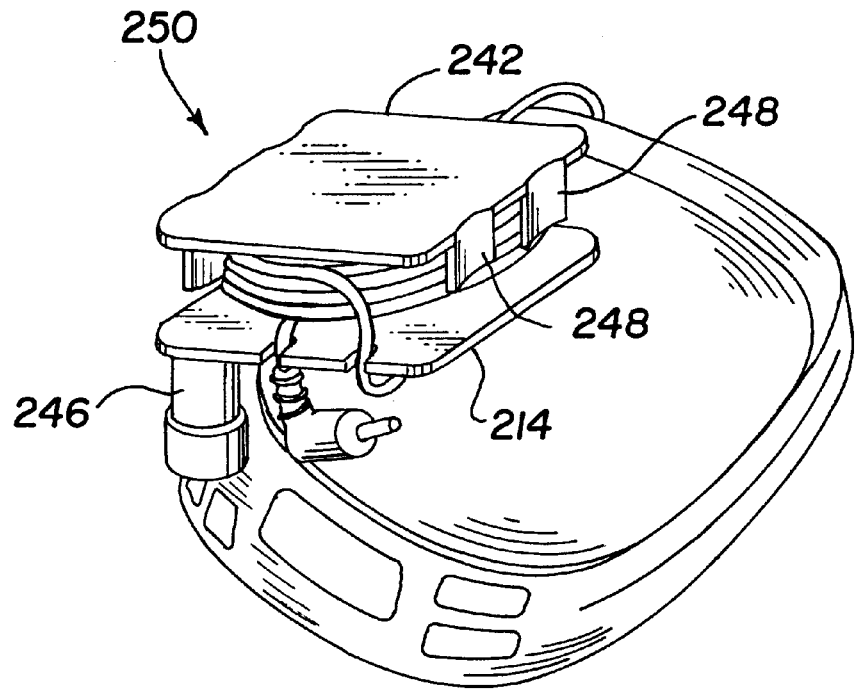
FIG. 8 is an isometric perspective view of rotatable tool 250, with powercord wound thereon while the powercord is attached to its typical electrical appliance, with powercord wound onto retaining member or spool, with plus end of cord gripped in one notch in the flange of the retaining member, and appliance end gripped in the other notch.

FIG. 8 is an isometric perspective view of rotatable tool 250, showing base 242, shaped finger grips 248, of which there are four each per tool 250, flange-retaining member 214, rotating knob handle 246, notches 218 and 220, and showing the powercord of a typical electronic appliance such as a headset or earphones with powercord, showing the powercord wound onto the retaining member 214 or spool, with the appliance of said cord gripped in a notch 218 in flange 214 and the plug end gripped in the other notch 220. As shown in FIG. 7a, the planar base 242 has a shaft member extending therefrom and co-axially received in the retaining member 214 or spool.

Figure 9:
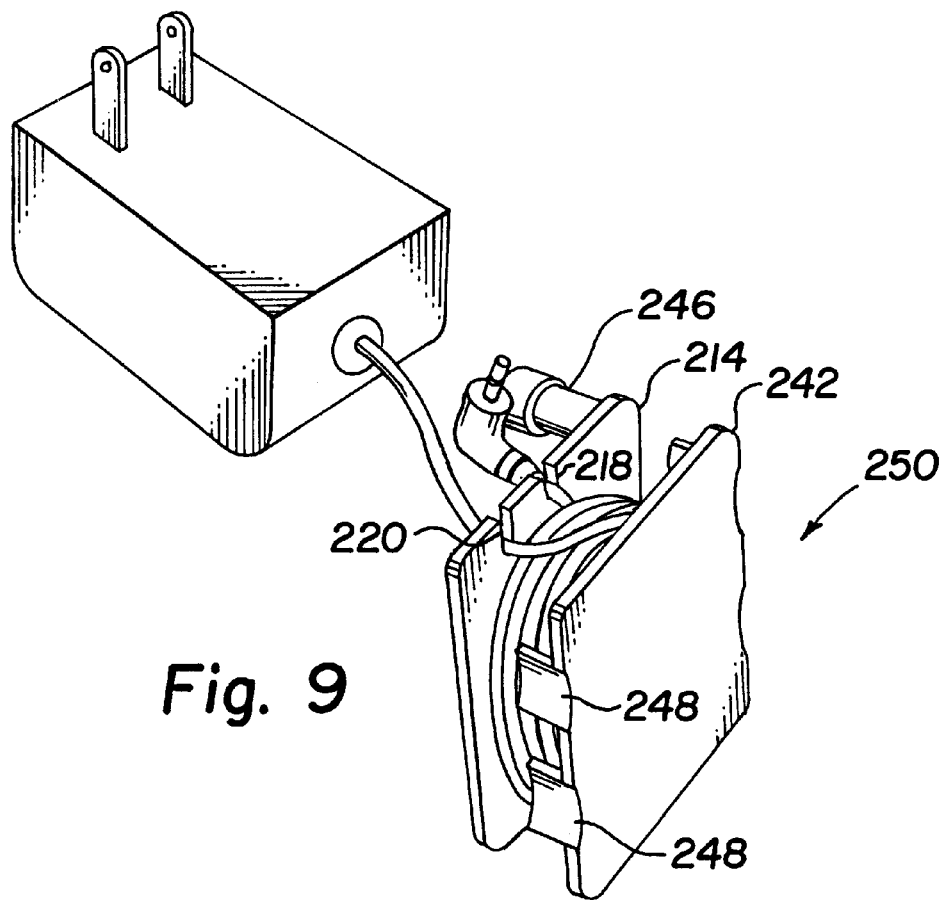
FIG. 9 is an isometric perspective view of rotatable tool 250, showing the powercord and converter of a typical appliance requiring conversion from AC to DC power, with the plug end of the cord gripped in one notch in the flange and the converter end gripped in the other notch.

FIG. 9 is an isometric perspective view of rotatable tool 250, showing base 242, shaped finger grips 248, of which there are four each per tool 250, flange-retaining member 214, rotating knob handle 246, notches 218 and 220, and showing the powercord and converter of an appliance requiring conversion from AC to DC power, with the converter end of said cord gripped in a notch 218 in flange 214 and the plug end gripped in the other notch 220.

FIG. 10 in an isometric perspective view of storage bin container 500 as another embodiment of this invention, shown empty, showing the container 500 which can hold and store typical appliances within itself, and showing racks 512, 514, and 516 on the front of said container 500, each of which can interface and fit with the retaining member 214 of powercord storage tool 250, without the rail-brackets that would otherwise be required. FIG. 10 also shows schematic alignment of two powercord storage tools 250, in location and aligned above the respective interface racks, into which they may be inserted, for holding said tools outside said containers.

FIG. 11 is an isometric perspective view of storage container 500, showing typical use of alternate embodiment storage system of this invention, with typical appliances in typical positions as the powercord will be wound onto storage tool 250, appliances and adapters placed and stored inside the appliance storage container 500, and the tools 250, with cord thereon interfaced and fitted onto the outside of the container 500, on container interface rack 512, and alternately rack 514, and 516.

In additional aspects of this invention, the storage slots 512, 514, and 516 are sometimes referred to as racks; storage bins 500 are sometimes referred to as storage bin containers 500, and as storage containers 500; and other nomenclatures are likewise used which will be obvious from the illustrations and are herein intended to be equivalent.

While the preferred embodiment, and typical alternative embodiments, of the component parts and assemblies of the storage system of this invention have been illustrated in the accompanying drawings and described herein, it is to be understood that the invention is not limited to the embodiments disclosed here, but is equally capable of numerous other equivalent arrangements, rearrangements, modifications, and substitutions of parts and elements, equivalently to achieve the functions, means, ways, and results disclosed herein, without departing from the spirit and teaching of the invention, and are equivalently covered within this disclosure of this invention.

What is claimed is:

1. Apparatus for storing an electrical appliance, adapter, and cord, the apparatus comprising:
   an appliance storage container defining an inner cavity for storing the electrical appliance;
   a cord storage tool having a planar base with at least two opposing edges, each of said opposing edges defining at least two concave indentions shaped for matching and receiving the convex shape of a human finger, and a retaining member rotatingly coupled to said base; and
   a rack on an outer surface of said appliance storage container adapted to interface with and removably receive said retaining member of said cord storage tool.

2. The apparatus of claim 1, wherein said base has a finger grip extending from each of said concave indentions toward said retaining member.

3. The apparatus of claim 1, wherein said retaining member comprises:
   a spool having a fixed planar flange attached to a first end of said spool, said flange oriented generally parallel to said planar base, and a handle attached near a perimeter of said fixed flange for winding the cord onto said spool; and
   a first and a second notch defined in said fixed flange, said first notch for removably gripping one end of the cord and said second notch for removably gripping the cord about another end.

4. The apparatus of claim 3, wherein said planar base has a shaft member extending therefrom and co-axially received in said spool.

5. The apparatus of claim 3, wherein said base has a finger grip extending from each of said concave indentions toward said retaining member.

6. The apparatus of claim 3, wherein said handle is rotatably attached.

7. An electrical cord storage tool for retaining a cord of an electrical appliance while attached to the electrical appliance, the electrical cord storage tool comprising:
- a planar base with two opposing edges, each of said edges defining at least two concave indentions shaped for matching and receiving the convex shape of a human finger to aid placing the cord onto said cord storage tool; and
- a retaining member rotatably coupled to said base, said retaining member comprising:
  - a spool having a fixed planar flange attached to a first end of said spool, and a handle attached near a perimeter of said fixed planar flange for winding the cord onto said retaining member; and
  - a first and a second notch defined in said fixed flange, said first notch for removably gripping one end of the cord and said second notch for removably gripping the cord about another end.

8. The electrical cord storage tool of claim 7, wherein said retaining member is receivable in a rack on an outer surface of an appliance storage container.

9. The electrical cord storage tool of claim 7, wherein said fixed planar flange of said retaining member is receivable in a rack on an outer surface of an appliance storage container.

10. The apparatus of claim 7, wherein said planar base has a shaft member extending therefrom and co-axially received in said spool.

11. The electrical cord storage tool of claim 7 wherein said base has a finger grip extending from each of said indentions toward said planar flange of said retaining member.

12. The electrical cord storage tool of claim 7 wherein said handle is rotatably attached.

13. An electrical cord storage tool for interface attachment to an outside surface of an electrical appliance storage container, the electrical cord storage tool comprising:
- a base; and
- a retaining member attached to said base, said retaining member comprising:
  - cord storage means on said retaining member for gripping, winding, and storing an electrical cord on said cord storage tool;
  - storage container attaching means on said retaining member for interfacing and attaching said cord storage tool to an appliance storage container, comprising a rack on the outside of said appliance storage container; said rack shaped to interface, receive, and hold said retaining member; and said retaining member configured to interface and attach to said rack on the outside of said storage container;
- said base comprising:
  - means for manually guiding and providing direct sensory feedback to the operator of the tension on said cord while it is being wound onto said cord storage means;
- said manual guiding and providing means comprising:
  - two opposing edges of said base, each edge shaped to contain two concave indentions; each indention shaped to match and receive the convex shape of a human finger;
  - a finger grip fixedly attached at each of said indentions of said base.

* * * * *